(12) United States Patent
Zierhut

(10) Patent No.: US 6,445,239 B1
(45) Date of Patent: Sep. 3, 2002

(54) BUS COUPLING WITH AMPLITUDE-CONTROLLED TRANSMISSION CIRCUIT

(75) Inventor: Hermann Zierhut, deceased, late of München (DE), by Ingeborg Zierhut, legal representative

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/214,199

(22) PCT Filed: Jun. 20, 1997

(86) PCT No.: PCT/EP97/03254

§ 371 (c)(1),
(2), (4) Date: Jan. 31, 2000

(87) PCT Pub. No.: WO98/01980

PCT Pub. Date: Jan. 15, 1998

(30) Foreign Application Priority Data

Jul. 4, 1996 (EP) .............................................. 96110850

(51) Int. Cl.$^7$ ................................................. G06G 7/19
(52) U.S. Cl. ...................... 327/313; 327/298; 327/306; 327/333
(58) Field of Search ................................ 327/172, 173, 327/174, 175, 178, 291, 295, 298, 306, 309, 313, 333

(56) References Cited

U.S. PATENT DOCUMENTS

| 3,573,506 A | * | 4/1971 | Morris ......................... 327/172 |
| 4,020,366 A | * | 4/1977 | Garner et al. ............... 327/100 |
| 4,254,443 A | * | 3/1981 | Wilson, Jr. ................ 363/56.11 |
| 4,264,896 A | * | 4/1981 | Sakarya et al. ............. 327/178 |
| 4,413,300 A | | 11/1983 | Sumi et al. |
| 4,667,118 A | * | 5/1987 | Maruta ........................ 327/172 |
| 5,019,730 A | | 5/1991 | Zierhut |
| 5,781,058 A | * | 7/1998 | Sanzo et al. ................. 327/387 |

FOREIGN PATENT DOCUMENTS

| EP | 4 306 | 10/1979 |
| EP | 346 572 | 12/1989 |

* cited by examiner

Primary Examiner—Terry D. Cunningham
(74) Attorney, Agent, or Firm—Harness, Dickey & Pierce, P.L.C.

(57) ABSTRACT

A bus coupling includes an amplitude-controlled transmission circuit for generating a substantially rectangular active pulse for a transmission pulse including an active pulse and an equalizer pulse for a bus system which guides alternating voltage data and direct voltage in order to prepare a vehicle wiring system voltage for user terminals, in particular for the bus of the European Installation Bus Association. The transmission circuit operates with a transmission circuit operates with a transmission stage which includes as a transmission transistor, a transmission valve functioning as a transistor in the transmission circuit. Depending on the function, the selection line of this transmission circuit is reduced in terms of the control signal by a transistor of the inverse type to the transistor in the collector circuit as reducing transistor. A capacitor, as a separating filter for the direct voltage, is connected, on the one hand, to a connection for a bus conductor; and, on the other, to a voltage divider which is also connected to a reference voltage, a tap of the voltage divider being connected to the base of the reducing transistor.

10 Claims, 1 Drawing Sheet

BUS COUPLING WITH AMPLITUDE-CONTROLLED TRANSMISSION CIRCUIT

FIELD OF THE INVENTION

The invention generally relates to a bus coupler. More preferably, it relates to an amplitude-controlled transmitting circuit for generating an essentially rectangular active pulse in a transmitting pulse made up of an active pulse and an equalizer pulse. The bus system conveys AC voltage information and DC voltage to make available the on-board voltage of subscriber stations. For example, in building systems technology, the European Installation Bus Association, EIBA, operates using a bus system of this type.

BACKGROUND OF THE INVENTION

In buildings systems technology, bus couplers, in which the bus carries AC voltage information and superimposed DC voltage for supplying the on-board networks of subscriber stations usually operate using a transformer whose volume can not be reduced to any considerable extent.

Such a bus coupler is common in a bus system in building system engineering, e.g., in accordance with EIBA. A conventional circuit arrangement for transmitting binary signals, which is described in European Patent Application No. 346 572, relates to a transmitting circuit for generating an essentially rectangular active pulse, AC voltage information and DC voltage being transmitted in order to make available on-board voltage of subscriber stations on the bus. The transmitting circuit, in each case, operates using a transmitting stage, which has a transmitting transistor in an emitter circuit, whose base is connected to the driving line.

SUMMARY OF THE INVENTION

An object of the present invention is to provide a bus coupler.

The cited objective is achieved in a bus coupler according to an embodiment of the present invention. The transmitting circuit operates using a transmitting stage, which has a transmitting transistor in an emitter circuit. The base of the transmitting transistor is connected to the driving line. To reduce the driving signal on the driving line, a reducing transistor is connected to the base of the transmitting transistor. The reducing transistor is of the inverse type with respect to the transmitting transistor. The emitter-collector path of the reducing transistor is connected in parallel to the base emitter junction of the transmitting transistor. The base of the reducing transistor is connected to the tap of a voltage divider, which at its one external terminal is connected to a reference voltage and at its other external terminal is connected to a capacitor functioning as a separating filter for the AC voltage. The capacitor is connected at its terminal to a bus connector. When transistors are mentioned here, it is only the mode of operation of such components that is meant, these components being capable of realization in integrated circuits.

In the bus coupler according to the present invention, the on-board voltage can be used as reference voltage for the voltage divider.

A more user-friendly bus coupler is achieved in a bus coupler according to another exemplary embodiment of the present invention.

In this case, a driver transistor, in accordance with its function, operates on the transmitting transistor, the driver transistor being limited in its amplitudes by the reducing transistor, a diode, in accordance with its function, being connected in series with the emitter of the reducing transistor. In this connection, the transmission amplitude is independent of the tolerance of the driving voltage at the input for the transmitting signal. It is advantageous if the transmitting circuit, operating as a control amplifier, is related, in its control threshold, to the frame potential. A substantial limiting is achieved by obtaining the control criterion through comparing the output amplitudes to the reference voltage via the voltage divider.

In order to limit the short-circuit currents, it is expedient if the transmitting transistor in its collector line has a resistor for limiting short-circuit currents.

At the connecting line between the capacitor as separating filter for the AC voltage and the voltage divider, it is advantageous to connect a receiver circuit. The receiver circuit to can advantageously have a pnp transistor in the emitter circuit and a collector resistor. The emitter of the pnp transistor is connected to the on-board voltage and its collector resistor is connected to the frame. Between the connection of the capacitor, as separating filter for the AC voltage, and of the voltage divider, on the one hand, to the receiver circuit, on the other hand, a filter can advantageously be connected for disturbances from the bus. This filter, according to a simple and advantageous embodiment, can be configured by a resistor and a capacitor.

BRIEF DESCRIPTION OF THE DRAWINGS

The invention will now be explained in greater detail on the basis of the exemplary embodiments indicated schematically in the drawings.

DETAILED DESCRIPTION OF THE PREFERRED EMBODIMENTS

Figure 1:
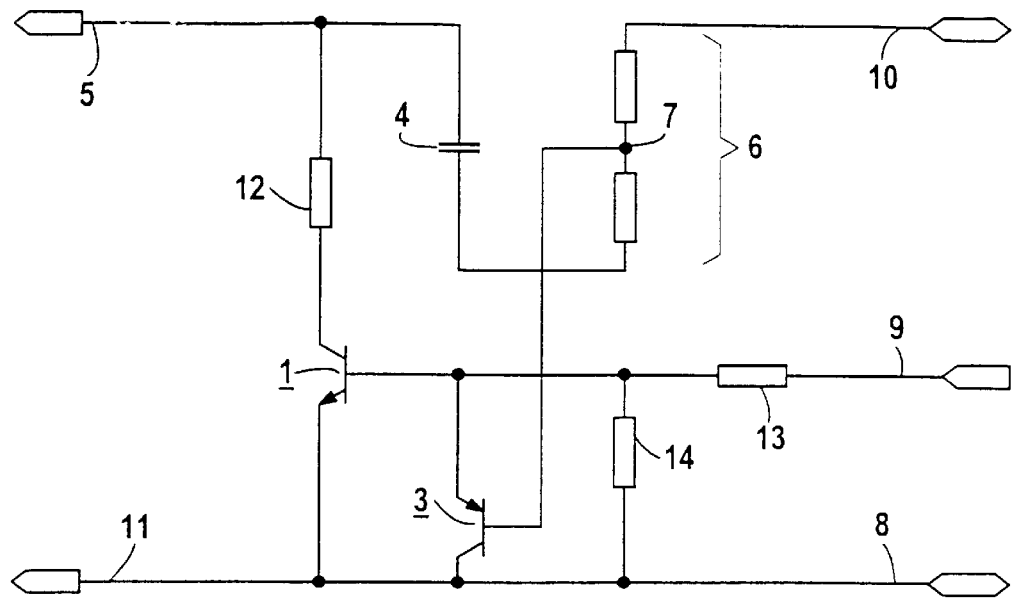
FIG. 1 shows an exemplary embodiment of a transmitting circuit including a simple base design according to the present invention.

The transmitting circuit according to FIG. 1 operates in the transmitting stage using a transmitting valve 1 which functions as a transistor in the emitter circuit, designated as transmitting transistor. In the driving line of the transmitting circuit, in accordance with its function, the drive signal is reduced by a transistor of the inverse type with regard to the transmitting transistor in the collector circuit, designated as reducing transistor 3. A capacitor 4 functions as separating filter for AC voltage and is connected, on the one hand, to a terminal for a bus conductor 5, and, on the other hand, to a voltage divider 6. The voltage divider 6 is also connected to a reference voltage. A tap 7 at the voltage divider is connected to the base of reducing transistor 3. If the control threshold of reducing transistor 3 which functions as control amplifier is related to frame potential 8, then the transmission amplitude is independent of the driving voltage at input 9 for the transmission signal, since the control criterion results from a comparison of the output amplitude of the transmitting signal with the reference voltage via voltage divider 6. The reference signal is applied on line 10. A terminal for a second bus conductor is designated as 11.

Using voltage divider 6, the switch threshold can be set for reducing transistor 3, for example, at one half the reference voltage, the internal resistance of a driving processor having then no more influence. To achieve a comparable resulting using conventional controlling technology, at least one operations amplifier would be required and thus the volume and economic expense would significantly increase.

A resistor 12 in the collector line of transmitting transistor 1 advantageously limits the short-circuit currents. As reference voltage the on-board voltage can be fed to line 10. Resistors 13 and 14 likewise form a voltage distributer, by means of which the operating point for transmitting transistor 1 can be set at one half the reference voltage. The inner resistance of a driving processor then no longer has any influence. To achieve a comparable result using conventional control engineering, at least one operational amplifier would be required, thus increasing the volume and economic expense significantly.

The circuit according to FIG. 1 is advantageous if the transmission current at input 9 is sufficiently large for the transmitting signal in order to drive transmitting transistor 1.

Figure 2:
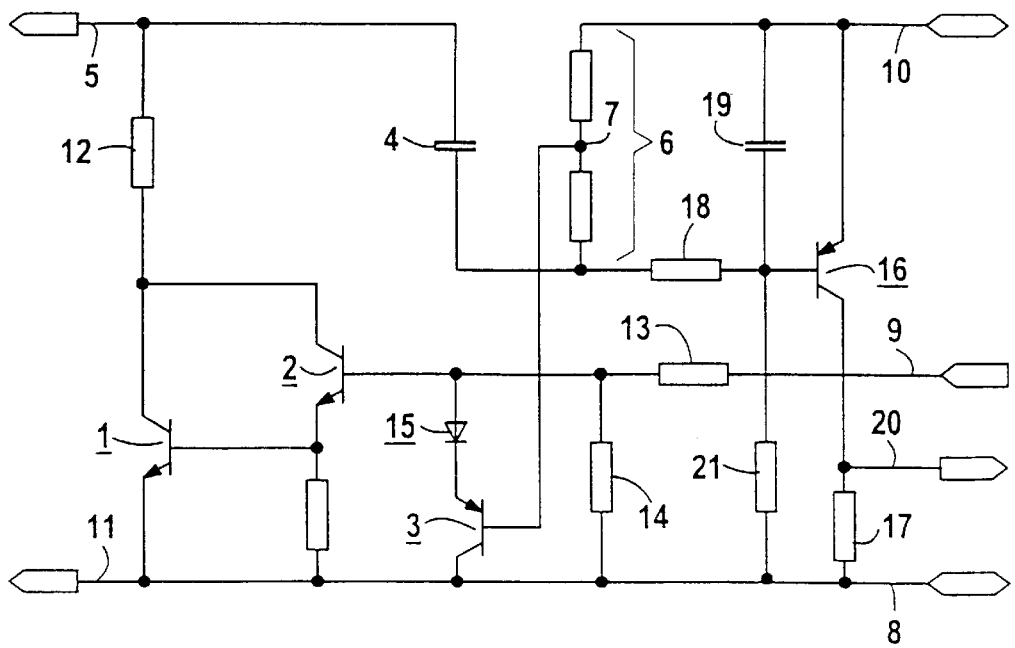
FIG. 2 shows another exemplary embodiment of the transmitting circuit of the bus coupler.

In the case of weaker transmission signals, if they are insufficient for directly driving transmitting transistor 1, a circuit according to FIG. 2 is advantageous. Here, a transistor, designated as driver transistor 2, in accordance with its function, operates on transmitting transistor 1, the driver transistor being limited in its amplitude by reducing transistor 3. A diode 15 is connected in series to the emitter of reducing transistor 3. On the connecting line between capacitor 4, which functions as the separating filter for AC voltage and DC voltage for the on-board network, and voltage distributor 6, a receiving circuit is additionally connected, which can be realized, using a few components, in a bus coupler according to FIG. 2: it has a pnp transistor, as a receiving transistor 16, in the emitter circuit, the collector being connected to frame 8 via a collector resistor 17. Between the connection of capacitor 4, which functions as a separating filter, and of voltage divider 6, on the one hand, and the receiving circuit having receiving transistor 16, on the other hand, a filter composed of resistor 18 and capacitor 19 is connected, by which disturbances from the bus are filtered out. The receiving circuit has output 20.

The circuit operates as follows:

Transmitting transistor 1, by its interface connection, constitutes the transmitting stage, and the driving transistor 2, by its interface connection, constitutes the driving stage. Reducing transistor 3, together with diode 15, an emitter diode, constitutes a control stage. Transmitting transistor 1 and driving transistor 2 could be combined in a FET. According to current practice, however, it is more economical to use two semiconductor areas, having bipolar transistors, or two separated bipolar transistors. It would also be possible to combine the transistors in a Darlington circuit in order to save components.

Resistor 18 and capacitor 19 consitute a low-pass filter. Together with receiving transistor 16 and collector resistor 17, these components essentially constitute the receiving circuit. If, for example, the voltage at the base of receiving transistor 16 decreases by about 0.7 volts, the transistor connects through, and a HIGH signal is fed from the transistor's collector to output 20.

If, during the transmitting process, a HIGH signal is applied at input 9, driving transistor 2 drives transmitting transistor 1. Limiting resistor 12, in this context, limits the current to a value, for example, below 0.3 amperes. In this context, the bus voltage applied at terminal 5 for a bus conductor is pulled in the direction of the voltage applied at terminal 11 for the second bus conductor, and to frame 8. Since capacitor 4, before the transmitting pulse, has been charged at a voltage corresponding to the bus voltage at terminal 5 minus the reference voltage at line 10, the complete transmitting amplitude, at the interconnection point of capacitor 4 and the lower resistor of voltage divider 6, appears excessively elevated to a voltage at the level of the reference voltage, on line 10. For example, the reference voltage can be set at 5V. Via voltage divider 6, this excessive voltage is reduced to the desired voltage of, for example, 5 or 7V at the base of reducing transistor 3. If the preselected maximum amplitude is exceeded, driving transistor 2 is controlled by reducing transistor 3 so that the preseltected voltage value of the transmitting amplitude is maintained.

Diode 15, in this context, accomplishes two essential tasks:

First, it functions to drive the transmitting stage and transmitting transistor 1 via the driving stage and via driver transistor 2, two base emitter voltages that generally have a strong temperature coeifficient becoming active. This temperature coefficient, however, is eliminated, since the driving of reducing transistor 3 via diode 15 likewise causes two base emitter voltages to become active. The second function is eliminating a control fault. For purposes of illustration, let it be assumed that the control variable has been set at 5V above the frame potential. The control point of action is situated at the base of driving transistor 2, i.e., at two base emitter voltages, namely that of transmitting transistor 1 and that of driving transistor 2, assuming two base emitter voltages above the frame potential. As a result of diode 15, in series with the base emitter junction of reducing transistor 3, the control reference point likewise lies two base emitter voltages above the frame potential. The two imaginary thresholds made up of base emitter voltages are, in this way, compensated so that no control fault can become active any longer.

If, between the base of transistor 16 and frame potential 8, a high-resistance resistor 21 is connected in order to set the operating point, the input operating point of the receiver can be reduced. For example, via resistor 21 in connection with voltage divider 6 and filter resistor 18, a current can be set such that at the base of receiving transistor 16 a biasing voltage of minus 0.4V arises so that the operating point of the receiving is reduced from 0.7V to 0.3V. In this way, the receiver is adjusted so as to be more sensitive.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A bus coupler for coupling an input driving line to a bus conductor of a bus system that conveys AC voltage and DC voltage to make on-board voltage of a subscriber station available, comprising:

an amplitude-controlled transmitting circuit, adapted to generate a substantially rectangular active pulse as a transmitting pulse and an equalizer pulse, the transmitting circuit including a transmitting stage, the transmitting stage including a transmitting transistor wherein a base of the transmitting transistor is connected to the input driving line, the transmitting stage further including a reducing transistor adapted to reduce a driving signal on the input driving line, the reducing transistor being a transmitter of an inverse type with respect to the transmitting transistor, a base of the reducing transistor being coupled to a tap of a voltage divider of the transmitting circuit, wherein a first external terminal of the voltage divider is coupled to a reference voltage and a second external terminal of the voltage divider is coupled to a first terminal of a capacitor, the capacitor functioning as a separating filter for the AC voltage, and wherein a second terminal of the capacitor and a collector of the transmitting transistor are coupled to the bus conductor.

2. The bus coupler according to claim 1, wherein the bus system includes a bus conforming to European Installation Bus Association ("EIBA") standards.

3. The bus coupler according to claim 1, wherein the on-board voltage functions as the reference voltage.

4. The bus coupler according to claim 1, wherein the transmitting stage includes a driving transistor and a diode, the driving transistor operating on the transmitting transistor, an amplitude of the driving transistor being limited by the reducing transistor, with the diodes being coupled in series with an emitter of the reducing transistor.

5. The bus coupler according to claim 1, wherein the transmitting transistor includes a resistor limiting a short-circuit current, the resistor being in a collector line of the transmitting transistor.

6. The bus coupler according to claim 1, wherein the transmitting stage includes a receiving circuit which is coupled on a connecting line between the capacitor and the voltage divider, the capacitor functioning as a separating filter for the AC voltage.

7. The bus coupler according to claim 6, wherein the receiving circuit includes a receiving transistor having a collector resistor, the receiving transistor being a pnp transistor, with an emitter of the receiving transistor being connected to the on-board voltage.

8. The bus coupler according to claim 6, wherein the receiving circuit includes a filter which is coupled between the first and second external terminals.

9. The bus coupler according to claim 8, wherein the filter includes a resistor and a capacitor.

10. The bus coupler according to claim 6, wherein the transmitting circuit further includes a high-resistance resistor, adapted to adjust an operating point.

* * * * *